(12) United States Patent
Azizi et al.

(10) Patent No.: US 7,366,177 B2
(45) Date of Patent: Apr. 29, 2008

(54) TRANSMIT SCHEDULING SUPPORTING TEMPORARILY UNAVAILABLE RECEIVERS

(76) Inventors: Shahrnaz Azizi, 17804 Creciente Way, San Diego, CA (US) 92127; Tejaswini, 11719 Springside Rd., San Diego, CA (US) 92128

(*) Notice: Subject to any disclaimer, the term of this patent is extended or adjusted under 35 U.S.C. 154(b) by 932 days.

(21) Appl. No.: 10/740,512

(22) Filed: Dec. 22, 2003

(65) Prior Publication Data

US 2005/0135377 A1 Jun. 23, 2005

(51) Int. Cl.
*H04M 11/00* (2006.01)
(52) U.S. Cl. ............ 370/395.4; 370/417; 370/429
(58) Field of Classification Search ............. 370/429, 370/395.4, 419
See application file for complete search history.

(56) References Cited

U.S. PATENT DOCUMENTS

| | | | | |
|---|---|---|---|---|
| 6,130,934 | A * | 10/2000 | Meek et al. | 379/100.09 |
| 6,529,588 | B1 * | 3/2003 | Meek et al. | 379/100.09 |
| 6,611,581 | B1 * | 8/2003 | Nelson et al. | 379/100.09 |

\* cited by examiner

*Primary Examiner*—Edan Orgad
*Assistant Examiner*—Jay P. Patel
(74) *Attorney, Agent, or Firm*—Venable LLP; James R. Burdett

(57) ABSTRACT

Transmissions may be scheduled in communication networks to accommodate the possibilities that target receivers are unavailable to receive.

20 Claims, 5 Drawing Sheets

TRANSMIT SCHEDULING SUPPORTING TEMPORARILY UNAVAILABLE RECEIVERS

BACKGROUND OF THE INVENTION

Sometimes, a receiving station in a communication network may become unavailable. Some examples of how this may happen are if a station leaves the networks, if a station goes down, or if a station performs some function that renders it unavailable to receive. As an example of the latter, a wireless local area network (WLAN) organized according to the IEEE 802.11 standard, published Jun. 26, 1997 (the IEEE 802.11 standard is a WLAN standard developed by an IEEE (Institute of Electrical and Electronics Engineers) committee in order to specify an "over the air" interface between a wireless client and a base station or access point, as well as among wireless clients), may require stations to perform background scans to keep track of changes in the network, and a station may be unavailable to receive during such a scan.

Such periods of unavailability may create problems. For example, an application running on one station may be attempting to transfer data to another station when that other station becomes unavailable. As a result, such an application may not be able to run to completion.

BRIEF DESCRIPTION OF THE DRAWINGS

Various embodiments of the invention will now be described in connection with the associated drawings, in which.

DETAILED DESCRIPTION OF EMBODIMENTS OF THE INVENTION

Figure 1:
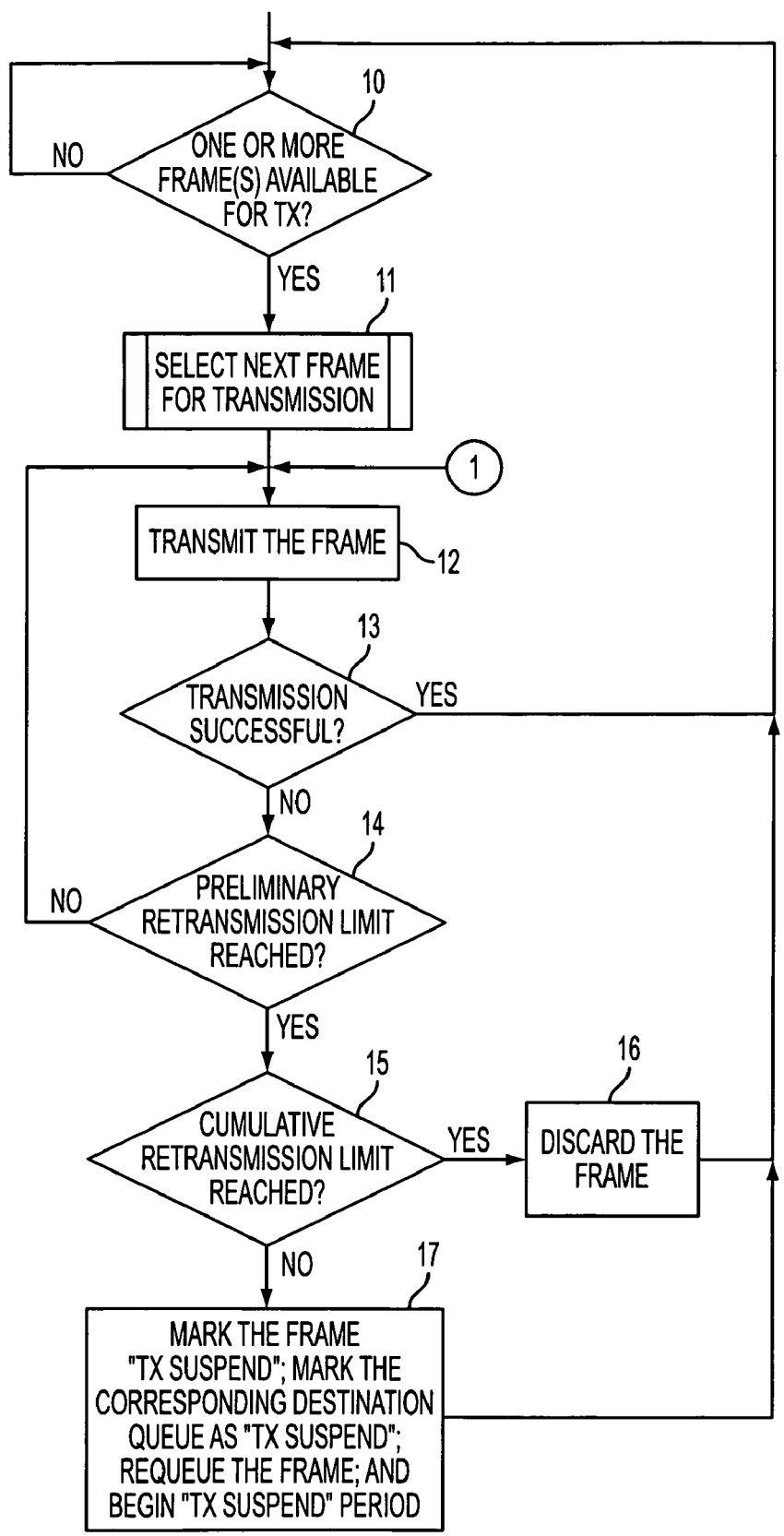
FIG. 1 depicts a flowchart of an exemplary embodiment of the invention.

In the following description, numerous specific details are set forth. However, it is understood that embodiments of the invention may be practiced without these specific details. In other instances, well-known circuits, structures, and/or techniques have not been shown in detail in order not to obscure an understanding of this description.

References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

FIG. 1 depicts a flowchart of an exemplary embodiment of the invention. In block 10, the process may determine whether or not there are frames (used here to denote any unit of data, voice, or other type information (or combination) for transmission) available for transmission. In block 11, the process may select a next frame for transmission. This will be discussed further below, in conjunction with FIG. 2.

Once a frame is selected, transmission may be attempted (block 12). If the transmission is successful, as may be determined in block 13, the process may check for further frames for transmission (block 10). Otherwise, if the transmission is unsuccessful, the process may determine, in block 14, if a preliminary frame retransmission limit has been reached. This preliminary frame retransmission limit may be a predetermined number, and it represents a number of times that a given frame may be retransmitted in a given frame transmission attempt. If the preliminary frame retransmission limit has not been reached, then the process may return to block 12 for a further attempt at transmission of the frame.

If the preliminary frame retransmission limit has been reached, the process may proceed to block 15 and may determine if a cumulative frame retransmission limit has been reached. The cumulative frame retransmission limit may be a predetermined number, and it represents a number of total times that a frame may be retransmitted. The cumulative retransmission limit may be expressed as, for example, but is not limited to, a number of preliminary frame retransmission limits or a total number of retransmissions (over all attempts to transmit the frame).

If the process determines that the cumulative retransmission limit has been reached, in block 15, the process may proceed to block 16, discard the frame, and return to block 10. Otherwise, if the cumulative retransmission limit has not been reached, the process may proceed to block 17 and may then proceed to block 10. In block 17, the frame may be designated as suspended (marked "Tx Suspend"); a transmit queue, corresponding to an intended target station for receiving the frame, may also be designated as suspended (marked "Tx Suspend"); and the suspended frame may then be requeued in the suspended transmit queue. In conjunction with this, a suspension period, denoted "Tx Suspend" Period in FIG. 1, may be begun. The "Tx Suspend" Period may be a predetermined period of time (which may, for example, be chosen based on typical periods of unavailability (for example, a scanning mode period in the example below), but which is not limited to being chosen in this fashion) and corresponds to a period of time during which the suspended transmit queue may remain suspended, as will be discussed further below, prior to reattempting transmission of frames from the suspended transmit queue. In this manner, a communication station employing the process may determine that the target station may be currently unavailable and may suspend transmission to that target station until it becomes available.

Note that, even though the transmit queue corresponding to the unavailable target station may have been suspended, the communication link may still be maintained as an active communication link. This may avoid the necessity of further overhead to reestablish a communication link after a suspension period has been terminated., The above situation may arise in, but is not limited to, a communication network according to the IEEE 802.11 WLAN standard. The IEEE 802.11 standard includes basic service set (BSS) and independent basic service set (IBSS) modes of operation. In the BSS mode, there may be access points (APs) and mobile elements (MEs), and the MEs connect with the APs. The IBSS mode, on the other hand, may represent an ad hoc network, in which ME may be coupled to other MEs. In the IBSS mode, each ME may periodically scan for information about a current state of the network (e.g., to determine with which other MEs communication may be possible). During such a scanning mode, the ME may not be available to receive messages from other MEs. Hence, if one of the other MEs has a message destined for the ME, it may not be successfully transmitted until after the ME completes its scanning. The above process, then, may permit the other ME the flexibility to retain messages destined for the ME until the ME becomes available.

In general, the above process may be applied, for example, to any network in which a station may become unavailable, either temporarily or permanently (e.g., if a station goes down or leaves a communication range of another station). The network stations may be mobile or stationary.

Figure 2:
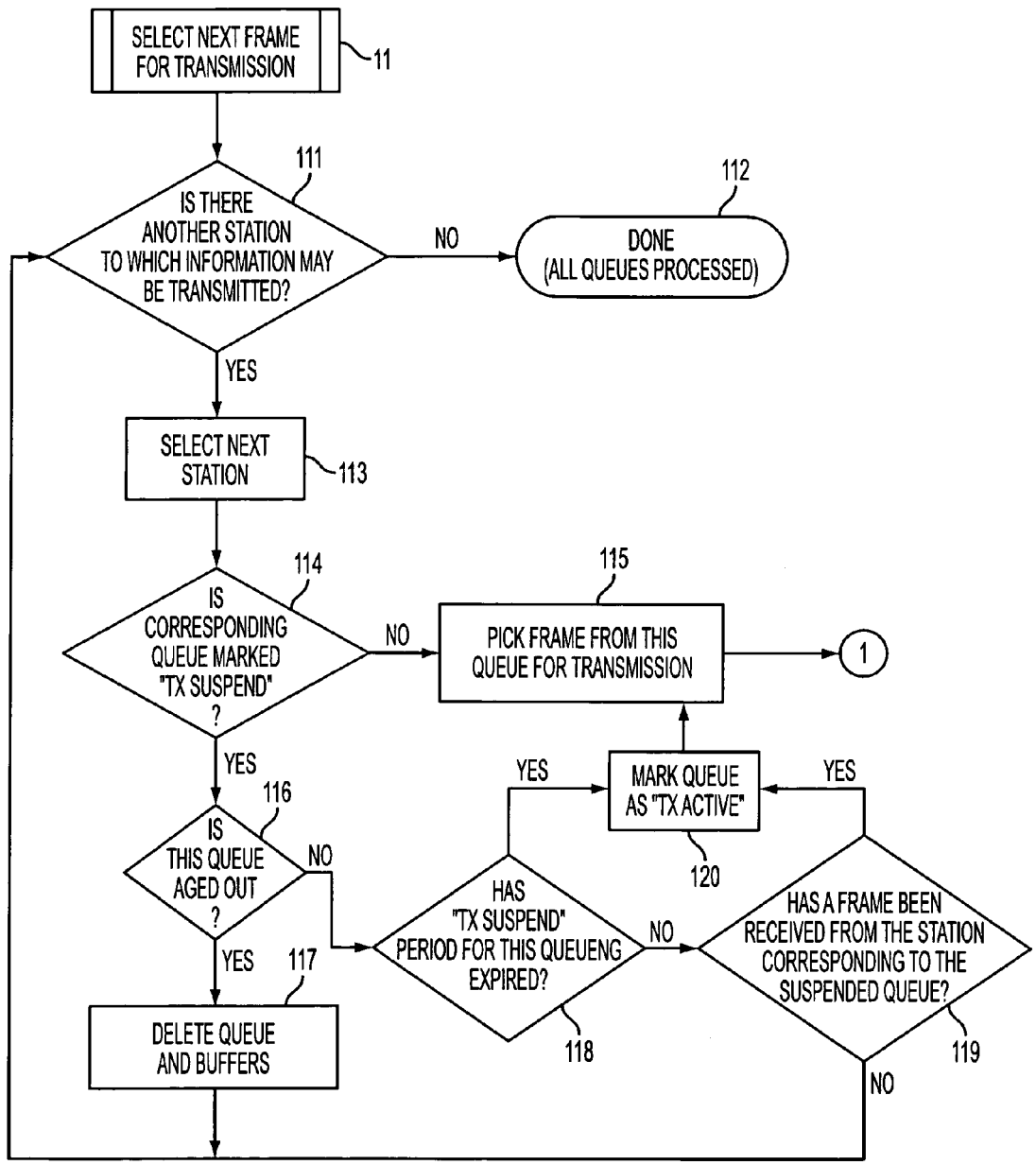
FIG. 2 depicts a further flowchart of a portion of the exemplary embodiment of FIG. 1.

As mentioned above, in block 11 of FIG. 1, a next frame may be selected for transmission. FIG. 2 contains a flowchart showing an exemplary embodiment of a process for selecting a frame for transmission (block 11). In block 111, the process may determine if there is another station to which information may be transmitted during a transmission time. For example, in the case of an IEEE 802.11 network operating in IBSS mode, this process may include each station within an IBSS session of a given station. In general, a station may maintain a transmit queue for each other station to which it may transmit; these are the queues to which this discussion refers. Furthermore, only queues in which there are one or more frames to be transmitted may be considered. If there are no more stations (i.e., all possible stations/queues have been considered), the process may end 112. Otherwise, in block 113, a next station/queue may be selected for consideration.

In block 114, the process may determine if a given transmit queue being considered for current transmission has been suspended, as discussed above in connection with block 17 of FIG. 1. If not, then the process may select a frame from this queue for transmission, block 115, and may continue to block 12 of FIG. 1. On the other hand, if the transmit queue under consideration has been suspended, the process may continue with block 116.

In block 116, the process may determine if the transmit queue under consideration has "aged out." By "aged out," it is meant that the particular transmit queue has been suspended for more than a predetermined time period (that is, the station corresponding to that transmit queue has been unavailable to receive for more than the predetermined time period). If the queue has aged out, then it is possible that the corresponding station is no longer available (for example, it may have gone down or have left the area). In this case, the process may continue to block 117, where the queue and its buffer contents may be deleted or may be marked for later deletion. In conjunction with this deletion, the corresponding communication link may also be broken. The process may then proceed back to block 111, and may skip this particular transmit queue.

If, on the other hand, the transmit queue under consideration has not aged out, the process may proceed to block 118 and may determine whether the "Tx Suspend" Period of the transmit queue under consideration has expired. If not, then the process may proceed to block 119, where the process may check to see if any information has been received from the station corresponding to the transmit queue under consideration. If not, then the process may proceed back to block 111 and may merely skip this transmit queue and move on to consider a next transmit queue.

On the other hand, if the "Tx Suspend" Period has expired, the process may proceed to block 120, where the queue may be designated as no longer being suspended (i.e., it may be re-designated as "Tx Active"). Similarly, if the "Tx Suspend" Period has not expired, but in block 119 it has been determined that information has been received from the station corresponding to the transmit queue under consideration, the process may also proceed to block 120, where, again, the queue may be designated as no longer being suspended. In either of these cases, the next frame for transmission may then be selected from this queue in block 115, and the process may continue with block 12, as discussed above.

Note that, in the process of FIG. 2, the order of blocks 118 and 119 may be reversed, if desired, so that the determination of whether information has been received from the station corresponding to the transmit queue under consideration may be done before checking whether or not the "Tx Suspend" Period has expired.

The process may continue until all transmit queues have been considered (block 117), or until a transmission time has ended.

Figure 3:
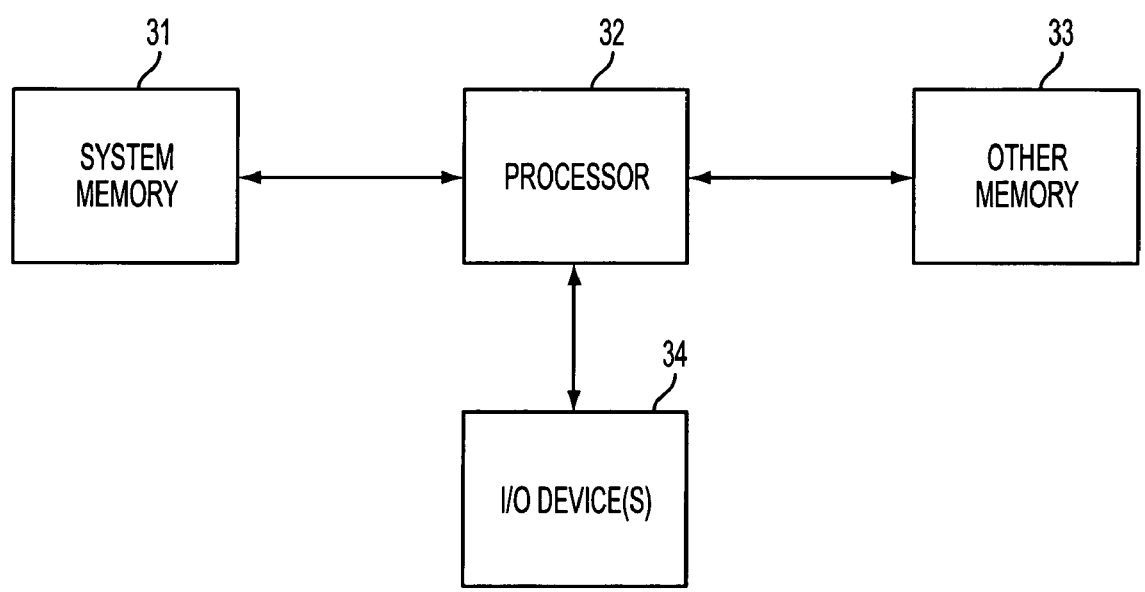
FIG. 3 depicts a conceptual block diagram of a system implementing an exemplary embodiment of the invention.

Some embodiments of the invention, as discussed above, may be embodied in the form of software instructions on a machine-readable medium. Such an embodiment is illustrated in FIG. 3. The computer system of FIG. 3 may include at least one processor 32, with associated system memory 31, which may store, for example, operating system software and the like. The system may further include additional memory 33, which may, for example, include software instructions to perform various applications. System memory 31 and additional memory 33 may comprise separate memory devices, a single shared memory device, or a combination of separate and shared memory devices. The system may also include one or more input/output (I/O) devices 34, for example (but not limited to), keyboard, mouse, trackball, printer, display, network connection, etc. The present invention may be embodied as software instructions that may be stored in system memory 31 or in additional memory 33. Such software instructions may also be stored in removable or remote media (for example, but not limited to, compact disks, floppy disks, etc.), which may be read through an I/O device 34 (for example, but not limited to, a floppy disk drive). Furthermore, the software instructions may also be transmitted to the computer system via an I/O device 34, for example, a network connection; in such a case, a signal containing the software instructions may be considered to be a machine-readable medium.

Furthermore, the invention may be used in systems that include, but are not limited to, wireless local area networks (WLANs), cellular networks, personal communication networks, etc. The invention may be incorporated into transceivers, network interface cards (NICs), and the like, which are intended to be non-limiting examples.

Figure 4:
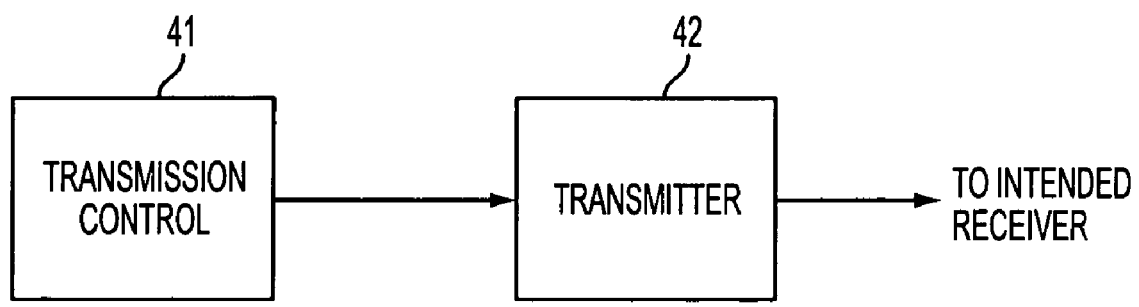
FIG. 4 depicts a further conceptual block diagram of a system implementing an exemplary embodiment of the invention.

FIG. 4 shows a possible configuration of a portion of such a transceiver, according to an exemplary embodiment of the invention. In FIG. 4, transmission control 41 may be implemented using the processes described above. Transmission control 41 may provide each message for transmission by transmitter 42. This may be performed, for example, by actually providing the message to transmitter 42 or by arranging for the message to be provided to transmitter 42 (for example, but not limited to, providing transmitter 42 with a memory location from which to obtain the message). Transmitter 42 may then transmit the message to an intended receiver (for example, but not limited to, another transceiver). Note that both transmission control 41, as discussed above, and transmitter 42 may be implemented in hardware, software, firmware, etc., or as combinations thereof and may, for example, utilize a common computing platform, if implemented in software and/or in firmware.

Figure 5:
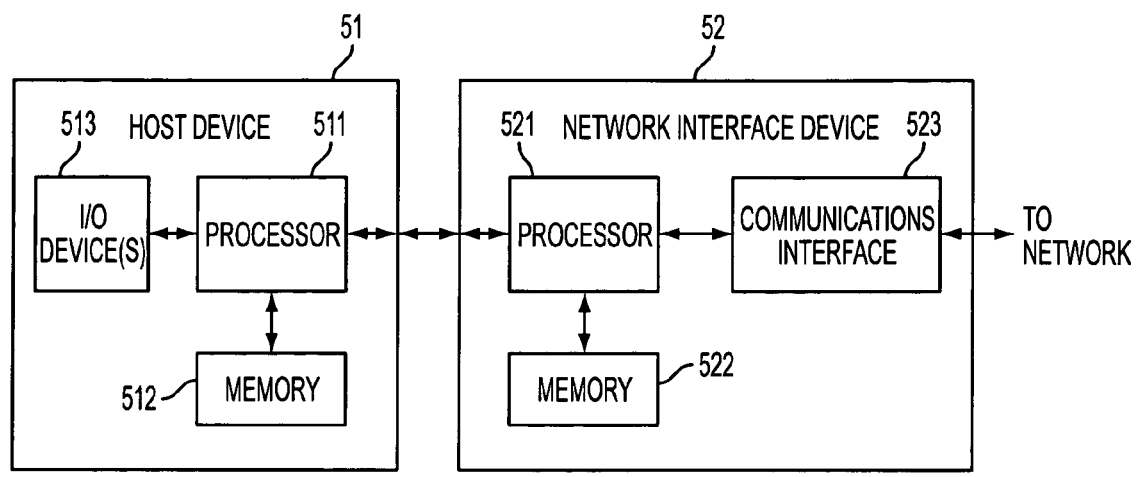
FIG. 5 depicts further details of an implementation of the system in the conceptual block diagram of FIG. 4, according to an exemplary embodiment of the invention.

FIG. 5 shows a particular implementation of an embodiment of the invention relating to those shown in FIGS. 3 and 4. In particular, the descriptions of similar components in FIGS. 3 and 4 may also apply to FIG. 5. In the embodiment of FIG. 5, a system may contain a host device 51, which may be, but is not limited to, a computer, laptop computer, or any other computing platform. As in FIG. 3, host device 51 may comprise at least one processor 511, at least one memory 512 (all memory is shown as a single memory block in this figure, but the invention is not limited to this implementation), and one or more I/O devices 513. In this particular implementation, the host device 51 is coupled to a network interface device 52. Network interface device 52 may contain at least one processor 521, memory 522 (which, as in the case of memory 512, is shown as a single block but is not limited to such an implementation), and a communications interface 523. Communications interface 523 may contain hardware, firmware, software, etc., implementing communications between network interface device 52 and a network. It may contain transmitter and/or receiver components, it may be divided into multiple components, or it may be implemented in some other fashion; the invention is not limited to any particular implementation of the communications interface. The methods discussed above may be implemented in either one or a combination of the host device 51 and the network interface device 52, in hardware, software, firmware, etc., or combinations thereof.

The invention has been described in detail with respect to preferred embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

What is claimed is:

1. A method, comprising:
    transmitting a message to a target station to which a communication link exists;
    determining that said target station is unavailable to receive;
    suspending transmission to said target station and buffering said message for a suspension period that is less than or equal to a predetermined suspension time, while maintaining said communication link; and
    retransmitting said message after termination of said suspension period,
    wherein said transmitting comprises:
        selecting a first transmit queue corresponding to one target station out of a plurality of transmit queues corresponding to a plurality of target stations;
        determining if the first transmit queue corresponds to a target station to which transmission has been suspended; and
        selecting a second transmit queue corresponding to another target station if the first transmit queue is determined to correspond to a target station to which transmission has been suspended, and otherwise selecting a message for transmission from said first transmit queue.

2. The method according to claim 1, wherein said selecting a second transmit queue comprises:
    determining if a suspension period of the first transmit queue has terminated if the first transmit queue corresponds to a target station to which transmission has been suspended, said suspension period being terminated upon one of expiration of said predetermined expiration time and receipt of a transmission from the target station to which the first transmit queue corresponds;
    selecting said message from the first transmit queue if the suspension period of the first transmit queue has terminated; and selecting the second transmit queue if the suspension period of the first transmit queue has not terminated.

3. The method according to claim 1, wherein said transmitting further comprises:
designating said first transmit queue and its contents for deletion if said first transmit queue corresponds to a target station to which transmission has been suspended for more than a predetermined aging time.

4. The method according to claim 1, wherein said transmitting comprises:
retransmitting said message up to a first predetermined number of times if it is not received after an initial transmission.

5. The method according to claim 1, wherein said retransmitting comprises:
discarding said message if said message has been retransmitted at least a number of times equal to a predetermined cumulative retransmission limit.

6. The method according to claim 1, wherein said suspension time is chosen based on a scanning period of a network element.

7. A machine-readable medium that provides instructions, which when executed by a computing platform, cause said computing platform to perform operations comprising a method of:
transmitting a message to a target station to which a communication link exists;
determining that said target station is unavailable to receive;
suspending transmission to said target station and buffering said message for a suspension period that is less than or equal to a predetermined suspension time, while maintaining said communication link; and
retransmitting said message after termination of said suspension period,
wherein said transmitting comprises:
selecting a first transmit queue corresponding to one target station out of a plurality of transmit queues corresponding to a plurality of target stations;
determining if the first transmit queue corresponds to a target station to which transmission has been suspended; and
selecting a second transmit queue corresponding to another target station if the first transmit queue is determined to correspond to a target station to which transmission has been suspended, and otherwise selecting a message for transmission from said first transmit queue.

8. The machine-readable medium according to claim 7, wherein said selecting a second transmit queue comprises:
determining if a suspension period of the first transmit queue has terminated if the first transmit queue corresponds to a target station to which transmission has been suspended;
selecting said message from the first transmit queue if the suspension period of the first transmit queue has terminated; and
selecting the second transmit queue if the suspension period of the first transmit queue has not terminated.

9. The machine-readable medium according to claim 8, wherein said determining if a suspension period of the first transmit queue has terminated comprises:
terminating said suspension period if a transmission has been received during said suspension period from the target station to which said first transmit queue corresponds.

10. The machine-readable medium according to claim 7, wherein said transmitting further comprises:
designating said first transmit queue and its contents for deletion if said first transmit queue corresponds to a target station to which transmission has been suspended for more than a predetermined aging time.

11. The machine-readable medium according to claim 10, wherein said transmitting further comprises:
breaking the communication link with the target station corresponding to said first transmit queue.

12. The machine-readable medium according to claim 7, wherein said transmitting comprises:
retransmitting said message up to a first predetermined number of times if it is not received after an initial transmission.

13. The machine-readable medium according to claim 7, wherein said retransmitting comprises:
discarding said message if said message has been retransmitted at least a number of times equal to a predetermined cumulative retransmission limit.

14. The machine-readable medium according to claim 7, wherein said suspending comprises:
designating said message as being suspended; and
designating a buffer in which said message is buffered as being suspended.

15. The machine-readable medium according to claim 7, wherein said suspension time is chosen based on a scanning period of a network element.

16. The machine-readable medium according to claim 7, wherein said suspending further comprises:
buffering one or more further messages intended for transmission to said target station.

17. A system, comprising:
a computing platform, performing a set of operations comprising:
transmitting a message to a target station to which a communication link exists;
determining that said target station is unavailable to receive;
suspending transmission to said target station and buffering said message for a suspension period that is less than or equal to a predetermined suspension time, while maintaining said communication link; and
retransmitting said message after termination of said suspension period,
wherein said transmitting comprises:
selecting a first transmit queue corresponding to one target station out of a plurality of transmit queues corresponding to a plurality of target stations;
determining if the first transmit queue corresponds to a target station to which transmission has been suspended; and
selecting a second transmit queue corresponding to another target station if the first transmit queue is determined to correspond to a target station to which transmission has been suspended, and otherwise selecting a message for transmission from said first transmit queue.

18. The system according to claim 17, further comprising:
a transmitter coupled to said computing platform and adapted to receive at least one message to be transmitted.

19. The system according to claim 17, wherein the computing platform comprises:
an interface device, the interface device comprising an interface device processor, wherein said interface device processor is adapted to perform at least a portion of said set of operations.

20. The system according to claim 19, wherein the interface device further comprises:

a machine-readable medium storing software that, when executed by said interface device processor, causes said interface device processor to perform said at least a portion of said set of operations, said machine-readable medium adapted to be coupled to said interface device processor.

* * * * *